Figure 3:
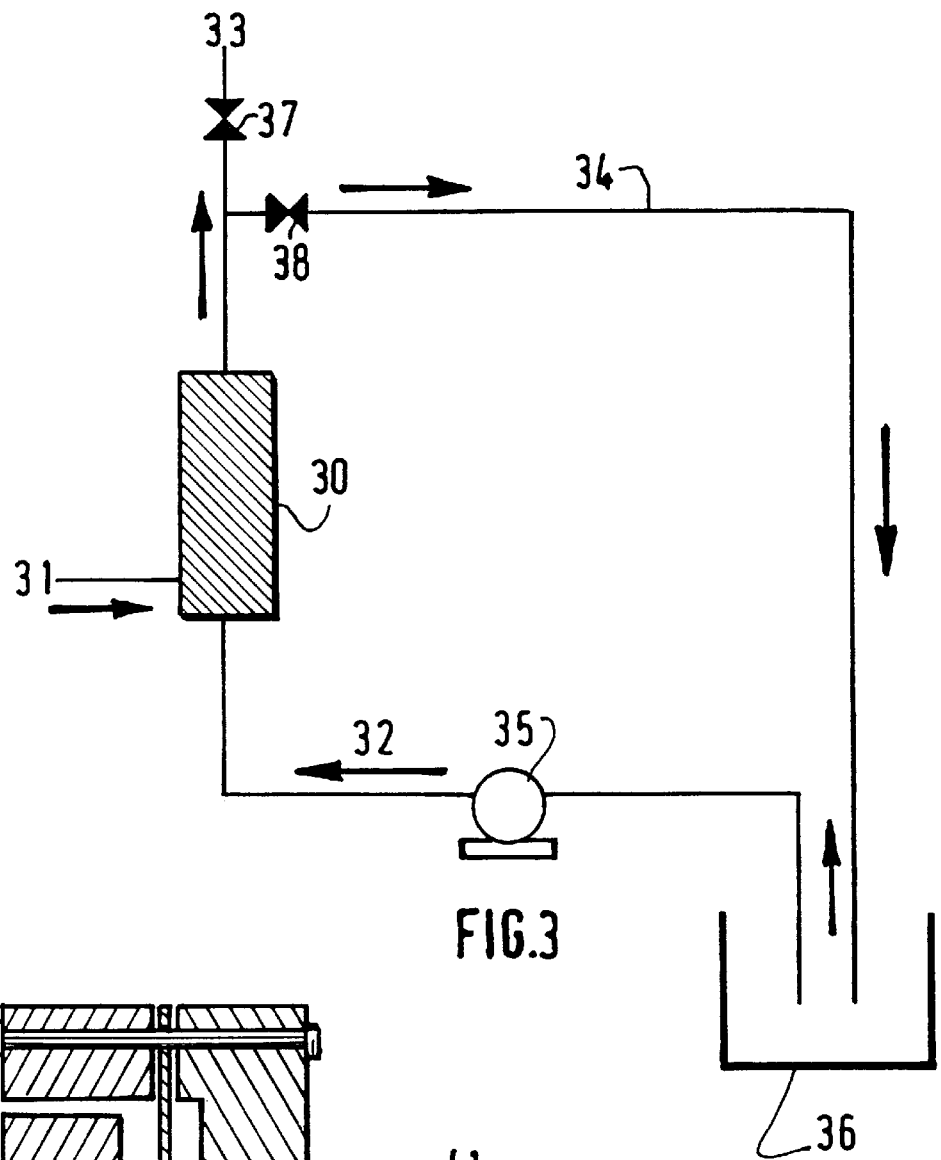

United States Patent [19]
Martin et al.

[11] Patent Number: 6,042,734
[45] Date of Patent: Mar. 28, 2000

[54] METHOD FOR DECONTAMINATING A PHOTOGRAPHIC EFFLUENT

[75] Inventors: Didier J. Martin, Givry; Olivier J. Poncelet, Chalon Sur Saone, both of France

[73] Assignee: Eastman Kodak Company, Rochester, N.Y.

[21] Appl. No.: 09/092,376

[22] Filed: Jun. 5, 1998

[30] Foreign Application Priority Data

Jun. 5, 1997 [FR] France ................................ 97 07203

[51] Int. Cl.$^7$ ........................................................ C02F 1/72
[52] U.S. Cl. ................................................ 210/763; 430/398
[58] Field of Search .................................. 210/763, 668, 210/694; 430/398; 502/304

[56] References Cited

U.S. PATENT DOCUMENTS 3,997,347  12/1976  Parsonage ............................... 430/398
4,710,484  12/1987  Dolhyj et al. ........................... 502/304

FOREIGN PATENT DOCUMENTS 0787689A  8/1997  European Pat. Off. .
2715924A  8/1995  France .

*Primary Examiner*—Ivars Cintins
*Attorney, Agent, or Firm*—J. Lanny Tucker

[57] ABSTRACT

The invention concerns a method for treating a photographic effluent with an oxidation catalyst. This catalyst is prepared by forming in situ, in a porous membrane, a cerium derivative. In this way the thiosulfate and organics contents of photographic effluents are reduced.

6 Claims, 2 Drawing Sheets

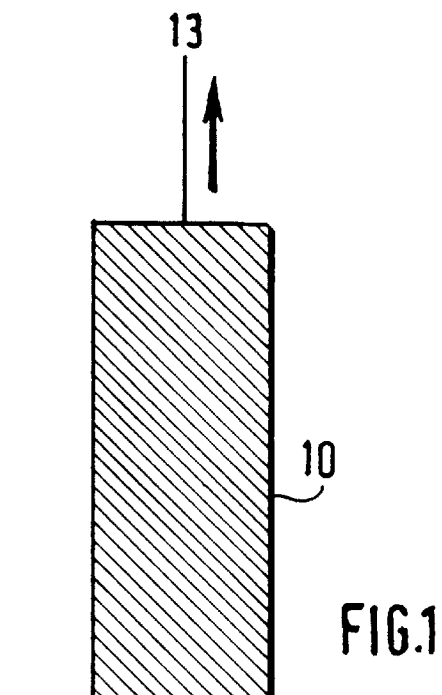
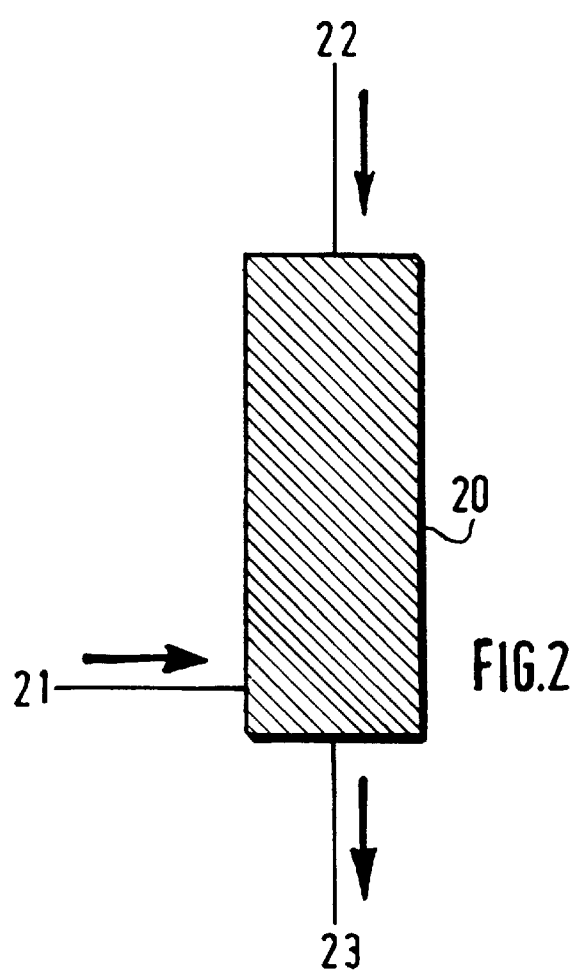

METHOD FOR DECONTAMINATING A PHOTOGRAPHIC EFFLUENT

The present invention concerns the purification of used (or seasoned) photographic processing solutions, with a view to recycling these solutions or discharging them to the drains.

Photographic processing generally comprises a final step which is a passage through a washing and/or stabilisation bath. The accumulation, in the washing and/or stabilisation baths, of substances coming from the prior processing steps is particularly prejudicial not only to the stability of the photographic images developed and to the correct maintenance of the desired sensitometric characteristics, but also to the possibility of either recycling these washing and stabilisation baths or discharging them to the drains. After some time of use, the washing and stabilisation baths contain inorganic compounds, such as iron, silver, thiosulfate, sulfite or sulfate ions or organic compounds which are either substances used for development or fixing, or by-products coming from the various processing steps. All these products contribute to raising the COD of the solution.

The problem represented by the high COD of the used photographic processing solutions is particularly critical in the case of "minilab" processing. Various techniques have been recommended for resolving this problem with a view either to recycling the solutions with the possible addition of new solution, without any harm to the photographic processing, or discharging to the drains without harm to the environment.

It is for example possible to subject the effluent to electrolytic oxidation, dialysis, reverse osmosis (as described in German patent application 3 246 897), flocculation, oxidation with ozone or oxygenated water, optionally coupled with UV treatment, as described in U.S. Pat. No. 5,439,599 of Gehin et al. It is also possible to combine non-catalytic oxidation with catalytic oxidation and biological treatment, as described in European patent application 690 025.

The treatments described in the literature usually recommend the combination of two or more techniques in order to obtain satisfactory decontamination of the effluent, enabling it to be discharged, or to eliminate the substances which would be detrimental to re-use of the effluent. Some of these techniques have a high application cost.

The object of the present invention is a method using a catalyst for decontaminating a seasoned photographic processing solution having a high COD as a result of the presence of oxidizable substances, in a simple and economical fashion.

In the present description and claims:

the words "photographic effluent" designate a used (or "seasoned") photographic processing solution, preferably the content of a washing bath or stabilisation bath, for example a Kodak RA-4 stabiliser for processing Ektacolor paper, or a C-41 stabiliser used for processing Flexicolor products, the COD of these effluents lies between 5 and 30 g/l, and preferably between 10 and 20 g/l, measured in accordance with the AFNOR standard NF T90-101.

The words "immobilised on the porous support" mean that the catalyst is present within and on the surface of the porous support.

The catalyst employed according to the invention is obtained from a cerium derivative. The process for preparing the oxidation catalyst, comprises the following steps:

(1) a porous support is impregnated with a cerium derivative, having an FT Raman spectrum exhibiting a first peak between 410 and 430 $cm^{-1}$ and a second peak between 530 and 560 $cm^{-1}$, and (2) the porous support impregnated at (1) is hydrolyzed and dried so as to form an oxidation catalyst immobilized on the porous support.

Although the formula of this cerium derivative is not exactly known, it is identified by means of its FT-Raman spectrum, which has characteristic peaks at 410–430 at 530–560 $cm^{-1}$, different for example from those observed with cerium oxides or alkoxides.

A method of preparing such a cerium derivative was described by L. M. Brown and K. S. Mazdiyasni in Inorg. Chem. 1970, 9, 2783. The method consists of causing the cerium to react with an alcohol, in an appropriate stoichiometry, optionally with a catalyst, in order to obtain the cerium derivative. If a controlled hydrolysis of this derivative is carried out, the reaction medium becomes viscous till a gel is formed, which allows recovery of the product. This technique is referred to in the literature as a "sol-gel" technique. An operating method is given in the following examples. It is possible to use, as the alcohol, an aliphatic alcohol with a straight or branched alkyl chain, optionally substituted, capable of solubilizing the cerium derivative. This solubilizing alcohol is for example 1-propanol, 1-butanol, isopropanol, or a polyol, for example a diol such as 1,3-buntanediol, or a substituted alcohol, such as alkoxyalkanol, for example 2-ethoxyethanol, 2-isoproproxyethanol, or an amino-alcohol, for example dimethylaminoethanol.

An alternative method of preparing the cerium derivative consists of causing a cerium salt to react on a metal alcoholate, for example alkali metal alcoholate, and then precipitating the product by adding an alcohol such as methanol or ethanol. The product can be dried and stored in the form of a powder until it is used. For this purpose, the powder can be dissolved in one of the aforementioned solubilizing alcohols and then the solution is hydrolyzed as indicated above.

The catalyst is then formed directly in situ and immobilized in the support, and any application or impregnation technique can be used for this purpose. A usual technique consists of impregnating the support with a solution of the cerium derivative and leaving the impregnated support exposed to ambient atmosphere. Hydrolysis is thus performed in situ. For this impregnation and hydrolysis, a solution of the cerium derivative in one of the aforementioned alcohols is used, with the optional addition of a volatile inert co-solvant.

When the catalyst is incorporated in the support, the quantity of cerium derivative, expressed in $mg/cm^2$, is between 0.01 $mg/cm^2$ and 10 $mg/cm^2$ and preferably between 0.1 and 5 $mg/cm^2$.

The support for the catalyst serves as a porous absorbent membrane for filtering and decontaminating the photographic effluent. Porous materials can be used, for example porous ceramics of the silica, borosilicate or alumina type, for example in a flat shape, or tubular, optionally with variable porosity. It is also possible to use materials based on activated carbon, such as ACTITEX® membranes, or equivalent materials, such as cloths or felts made of activated carbon, or else particles or granules of activated carbon, preferably with a specific surface area greater than 500 $m^2/g$ and preferably greater than 1000$m^2/g$.

The method according to the invention makes it possible to decontaminate the photographic effluent, by reducing its COD and in particular decreasing its content of substances such as thiosulfate, and organic substances such as hydroquinone and hydroquinone derivatives, phenidone and derivatives thereof, paraphenylene diamines used as color developers, heterocylic compounds used for example as an anti-fogging agent, surfactants, for example with oxidizable unsaturations. The treatment, that is to say the contact between the catalyst and the used effluent, is carried out at a temperature between 15 and 60° C. and preferably at room temperature. It is not necessary to carry out a prior dilution of the treated effluent. The treatment can therefore be performed directly at the overflow of the photographic processing tanks. The treatment can be carried out at atmospheric pressure, that is to say without the application of pressure or negative pressure, unlike ultrafiltration treatments. However, if desired, the treatment can be carried out under pressure.

FIG. 1 depicts schematically a specimen installation using the method according to the invention. A reactor 10 comprises one or more membranes with a carbon support impregnated with the cerium-based catalyst described above. Inside the reactor, the membrane or membranes can be disposed in any suitable fashion, including in a spiral or in concentric cylindrical leaves. The pipe 11 is an air feed which is used for oxidation. The pipe 12 is the inlet for the effluent to be treated and the pipe 13 the outlet for this effluent after treatment.

FIG. 2 depicts a variant of the above specimen, a variant in which the oxidation air (pipe 21) is caused to flow counter to the effluent to be treated (pipe 22).

FIG. 3 depicts a diagram of an installation comprising an oxidation reactor 30, an inlet for effluent to be treated 32, coming from a reserve 36, an air inlet 31, an outlet 33 enabling the treated effluent to be returned to the machine, a recirculation loop 34, valves 37–38 and a pump 35.

Figure 4:
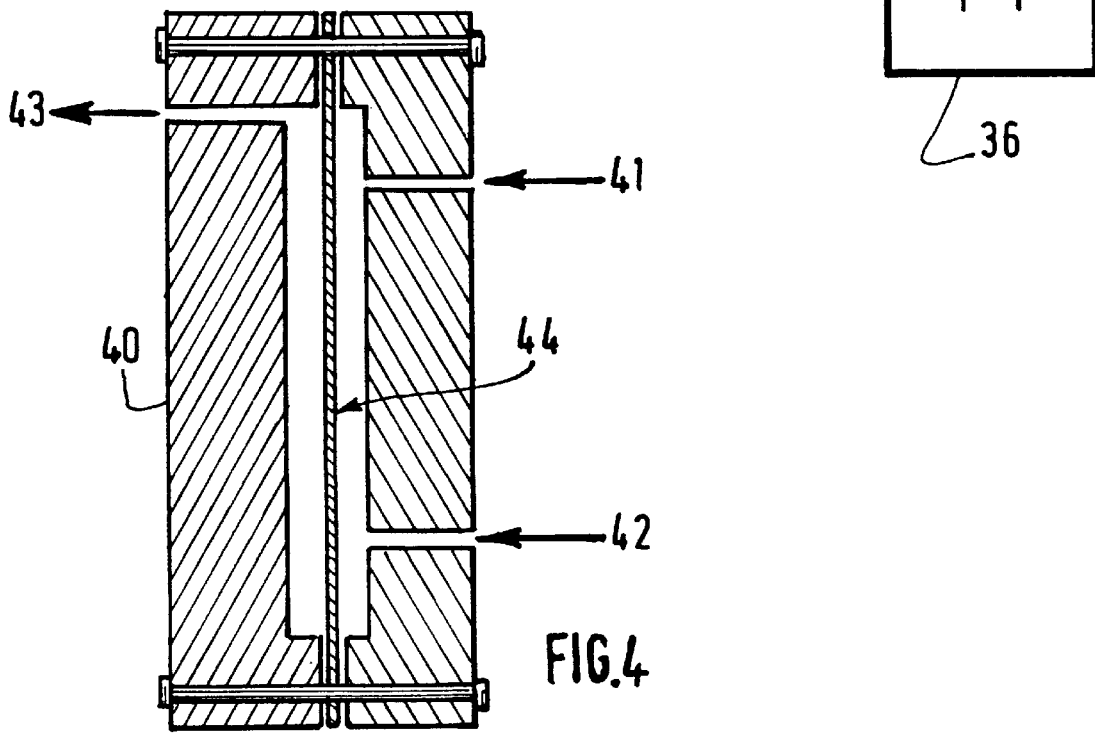

FIG. 4 depicts a reactor for the catalytic oxidation treatment, comprising two plastic half-shells pressed against one another and between which the membrane 44 is disposed with a space allowing the effluent to flow (pipes 42–43). The pipe 41 is an air inlet.

The following examples illustrate the invention.

EXAMPLE 1

Preparation of Catalyst 14.01 g of metallic cerium in slivers (0.1 mole) is mixed with 100 ml of anhydrous toluene. 100 ml of freshly distilled 2-methoxyethanol was added, and then 10 mg of $Hg_2Cl_2$. The mixture was heated to reflux whilst stirring vigorously for 2 days. The mixture was filtered and the filtrate was recovered and concentrated. The product (1a) was purified by crystallisation in a mixture of toluene and methylene chloride. A solution (1b) of 1 g of the product (1a) in 50 ml of absolute ethanol was prepared; this solution was stored in an argon atmosphere.

A porous membrane of Actitex CS 1301 activated carbon porous membrane was used as a catalyst support. This membrane has a specific surface area of 1300 $m^2/g$. This membrane was immersed in 15 ml of solution (1b) for 15 minutes whilst keeping in an argon atmosphere and with ultrasonic agitation and at room temperature. The membrane thus impregnated was then dried for 1 hour in ambient air and at room temperature. After drying, the membrane was washed by immersing it in water for 15 minutes, with ultrasonic agitation. The membrane was then left to dry at room temperature for 10 hours.

EXAMPLE 2

Preparation of Catalyst 13.7 g of barium in granule form (0.1 mole) was mixed with 100 ml of freshly distilled 2-methoxyethanol. A highly exothermic reaction results. After 2 hours, the mixture was filtered and the colourless filtrate was evaporated until dry. The product was recrystallised in a mixture of hexane and THF. 27.3 g of product (2a) was obtained (yield 95%). A solution 2b of 1 g of product 2a in 50 ml of absolute ethanol was prepared. A sample of Actitex CS 1501 membrane, identical to that of Example 1, was immersed in a mixture consisting of 15 ml of solution (1b) and 15 ml of solution (2b) for 15 minutes whilst keeping it in an argon atmosphere and with ultrasonic agitation. The membrane impregnated as in Example 1 was then dried (hydrolysed) and washed.

EXAMPLE 3

Samples were treated of 250 ml of Kodak RA-4 stabilizer, used in processing on Ektacolor paper, passing them through a reactor in accordance with the diagram in section in FIG. 4. This reactor 40 comprised two plastic half-shells pressed against one another and between which the membrane 44 was disposed with a space allowing the effluent to flow (pipes 42–43). The pipe 41 was used for the air inlet. The membrane surface offered to the reaction was 32 $cm^2$. A pump supplied a flow rate of 25 ml/minute.

The thiosulfate concentrations of the effluent were determined as a function of the duration of the catalytic oxidation treatment in the reactor. The effectiveness of the treatment was measured by the reduction in the thiosulfate contents, expressed as a % with respect to the contents before treatment. The results are given in Table 1 below.

TABLE 1

| Membrane | Reduction in thiosulfate (%) | Increase in the sulfate content (%) |
| --- | --- | --- |
| Actitex, without catalyst | 5 | 0 |
| Actitex with Ce catalyst | 24 | 7 |
| Actitex with Ce + Ba catalyst | 49 | −22.5 |

Whereas the Actitex support has only a low capacity of absorption of thiosulfate, the presence of the catalyst in this support allows the oxidation (and elimination) of a major part of the thiosulfate.

The method of invention thus allows an advantageous elimination of the thiosulfate, without forming an excessive quantity of sulfate in the ions, as is the case with conventional oxidants such as $H_2O_2$.

We claim:

1. A method for eliminating oxidizable substances from a photographic effluent comprising the step of contacting a photographic effluent containing oxidizable substances with a catalyst, wherein the catalyst is obtained through the following steps:

(1) impregnating a porous support comprised of an activated carbon membrane with a cerium derivative, having a FT Raman spectrum exhibiting a first peak between 410 and 430 $cm^{-1}$ and a second peak between 530 and 560 $cm^{-1}$, and (2) hydrolizing and drying the porous support impregnated at (1) so as to form an oxidation catalyst immobilised on the porous support.

2. The method of claim 1, wherein the photographic effluent (i) comes continuously from a photographic processing bath, (ii) passes through a loop comprising a module containing the catalyst, and (iii) is recycled in the photographic processing bath.

3. The method of claim 2, wherein the photographic processing bath is a stabilization bath of a color process.

4. The method of claim 2, in which the photographic processing bath is comprised of washing waters of a color process.

5. The method of claim 1, wherein the porous support is further impregnated with a derivative of an alkaline-earth metal.

6. The method of claim 6, wherein the alkaline-earth metal is barium.

* * * * *